United States Patent [19]

Noe

[11] Patent Number: 5,384,104
[45] Date of Patent: Jan. 24, 1995

[54] URANIUM CARBONATE EXTRACTION PROCESS

[75] Inventor: Ronald O. Noe, Hopkins, S.C.

[73] Assignee: Westinghouse Electric Corporation, Pittsburgh, Pa.

[21] Appl. No.: 976,608

[22] Filed: Nov. 16, 1992

[51] Int. Cl.6 .............................................. C22B 60/02
[52] U.S. Cl. .......................................... 423/15; 423/17; 423/18
[58] Field of Search ................................ 423/15, 17, 18

[56] References Cited

U.S. PATENT DOCUMENTS

| | | | |
|---|---|---|---|
| 2,992,887 | 7/1961 | Thunaes et al. | 24/14.5 |
| 4,374,096 | 2/1983 | Skeaff et al. | 423/18 |
| 4,405,566 | 9/1983 | Weis et al. | 423/18 |
| 4,423,010 | 12/1983 | Maurel | 423/17 |
| 4,436,704 | 3/1984 | Krennrich et al. | 423/17 |
| 4,438,077 | 3/1984 | Tsui | 423/17 |

Primary Examiner—Donald P. Walsh
Assistant Examiner—Frederick H. Voss
Attorney, Agent, or Firm—J. C. Spadacene

[57] ABSTRACT

A process for extracting uranium from uranium-containing waste residues. The process dissolves the residue in hot nitric acid, and precipitates the resulting solution with sodium carbonate/sodium bicarbonate.

14 Claims, 1 Drawing Sheet

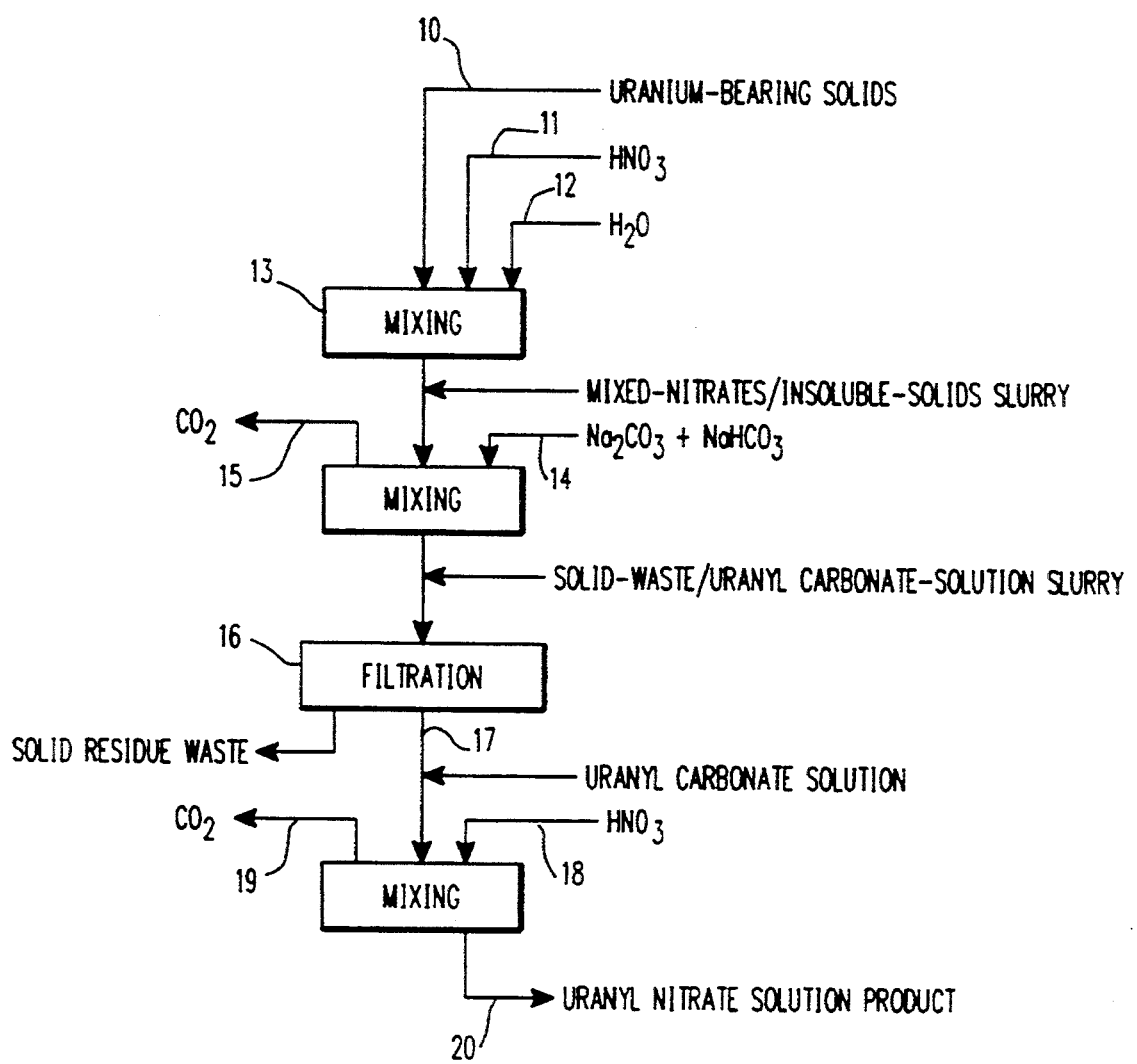

URANIUM CARBONATE EXTRACTION PROCESS

FIELD OF THE INVENTION

The present invention relates to the art of extracting metals from waste residues, and more particularly relates to the extraction of uranium from uranium-bearing solids.

BRIEF DESCRIPTION OF THE PRIOR ART

Residues from fuel chemical processes are routinely analyzed, packaged, and buried. Scrap processing residues typically contain about 1% uranium with a number of impurities.

Existing techniques for extracting uranium include subjecting the residue to high pressure, high temperature treatments over extended contact times. See, e.g., Kreninrich, U.S. Pat. No. 4,436,704, in which uranium dioxide is extracted at 130–260 degrees centigrade, and superatmospheric pressure. Such approaches have the drawback of requiring a pressure vessel, such as an autoclave, and increased energy consumption.

Thunaes, et al., U.S. Pat. No. 2,992,887, discloses a method of leaching uranium ores using alkaline carbonates and bicarbonates at atmospheric pressure.

Maurel, U.S. Pat. No. 4,423,010, discloses a process for the selective removal of arsenic materials from uriniferous ore in the presence of an oxidizing agent by means of an aqueous liquor formed by a recycling solution containing alkali metal carbonate and bicarbonate, preferably at temperatures of 120–240 degrees centigrade.

Tsui U.S. Pat. No. 4,438,077, discloses a method for the recovery of uranium and other minerals from uranium ore by subjecting the uranium ore to a mild oxidative carbonate leach fluid, subsequently subjecting the uranium ore to an oxidative chemically severe leaching system.

It would be desirable to provide a method for extracting uranium from uranium-bearing residuals at atmospheric pressure and lower temperature than the prior art methods.

SUMMARY OF THE INVENTION

The process of the present invention extracts uranium from uranium-containing residues using direct treatment of nitric acid solutions/slurries with sodium carbonate/bicarbonate. The process involves oxidizing, pulverizing, and batch sizing the residue to a batch suitable for a filter press, dissolving the solids in an acid bath, neutralizing the acid bath with sodium carbonate/bicarbonate to form a slurry, filtering the slurry to form a filter cake, washing the filter cake, thereby producing a uranium-containing filtrate stream, and precipitating uranium from the filtrate stream.

BRIEF DESCRIPTION OF THE DRAWINGS

A full understanding of the invention can be gained from the following description of the preferred embodiments when read in conjunction with the accompanying drawing in which:

FIG. 1 is a process flow sheet illustrating a preferred embodiment of the invention.

DESCRIPTION OF THE PREFERRED EMBODIMENTS

Referring to FIG. 1, according to the present invention, uranium-bearing solids 10 are oxidized, for example, by treatment in an oxidation oven at 600° C., pulverized to a size of about 100–300 mesh, and batch sized to about 10–14 kg to accommodate a filter press. The solids are then mixed with an acid 11 and water 12 in a mixing vessel 13, where the solids are digested. This digesting step lasts about 45 minutes. Preferably nitric acid is used, at about 25% by weight and a temperature of about 140° F. to 160° F., at atmospheric pressure. Other acids, for example, such as sulfuric and perchloric, could also be used in the digesting step.

The acid solution, comprising a mixed-nitrates/insoluble solids slurry, is then neutralized by adding a neutralizing agent, such as solid, anhydrous sodium carbonate/sodium bicarbonate 14, liberating $CO_2$ (15). Sufficient excess of sodium carbonate/bicarbonate is added to complex the uranium present, by bringing the pH of the mixture to 8.0–9.5. The weight ratio of sodium carbonate to sodium bicarbonate is preferably about 2:1. Ammonium carbonate solution can also be used.

The carbonate slurry is filtered through a filter medium, 16, such as a dissolver filter press. The resulting solid residue waste filter cakes are washed, preferably in three stages, using a 5% sodium bicarbonate solution. The carbonate filtrate and sodium bicarbonate wash liquid are combined 17, producing a uranyl carbonate solution, which is acidified, for example, by mixing with nitric acid 18, again, liberating $CO_2$ (19).

The product 20, uranyl nitrate solution, is then treated with a precipitant, such as caustic (10–40 percent solution), to precipitate the uranium from the uranyl nitrate solution. The precipitated diuranate is then dissolved in nitric acid once again and sent through solvent extraction to purify.

The process of the invention reduces uranium content in the residues to the 200–225 ppm level. This is equivalent to a recovery capability of about 98% on a commercial scale using existing process equipment.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

I claim:

1. A process for extracting uranium from uranium-bearing solids, comprising the steps of:
   a. oxidizing, pulverizing, and batch sizing said solids to a size suitable for a filter means;
   b. dissolving said solids in an acid bath;
   c. neutralizing said acid bath to form a slurry;
   d. filtering said slurry through a filter means to form a filter cake;
   e. washing said filter cake, thereby producing a uranium-containing filtrate stream;
   f. acidifying said uranium-containing filtrate stream: and
   g. precipitating uranium from said acidified filtrate stream.

2. The process of claim 1 wherein said acid bath comprises nitric acid.

3. The process of claim 2 wherein said nitric acid is hot, 25% nitric acid.

4. The process of claim 1 wherein said neutralizing is accomplished using sodium carbonate/sodium bicarbonate.

5. The process of claim 4 wherein said filter cakes are washed in three stages with a sodium bicarbonate solution.

6. The process of claim 5 wherein said sodium bicarbonate solution is about 5% sodium bicarbonate.

7. The process of claim 1 wherein said filter means comprises a dissolver filter press.

8. The process of claim 1 wherein said uranium is precipitated with caustic.

9. A process for recovering uranium from uranium-bearing waste residues comprising the steps of:
   a. oxidizing, pulverizing, and batch sizing said residue to a size suitable for a filter press;
   b. dissolving said residues in a hot nitric acid bath;
   c. neutralizing said hot nitric acid bath with sodium carbonate/sodium bicarbonate to form a slurry;
   d. filtering said slurry through a filter press to form a filter cake;
   e. washing said filter cake with a sodium bicarbonate solution to yield a sodium bicarbonate filtrate;
   f. acidifying said filtrate to neutralize said carbonate;
   g. precipitating uranium from acidified filtrate.

10. The process of claim 9 wherein said hot acid is 25% $HNO_3$ by weight.

11. The process of claim 9, wherein said hot nitric acid has a temperature of about 140°–160° F.

12. The process of claim 9 wherein said sodium carbonate/sodium bicarbonate of step (c) is added in excess to bring the pH of said slurry to about 8.0–9.5.

13. The process of claim 9, wherein said sodium carbonate and sodium bicarbonate are present in a weight ratio of about 2:1, respectively.

14. The process of claim 9, wherein caustic is used in step (g) for precipitating said uranium.

* * * * *